R. O. HAMMOND.
SHIPPING CRATE OR CASE FOR EGGS OR THE LIKE.
APPLICATION FILED OCT. 22, 1914.

1,155,234.

Patented Sept. 28, 1915.

Witnesses:
E. E. Alger.
J. H. Rathvon

Inventor:
Robert O. Hammond,
By Chas. C. Richardson,
Attorney.

UNITED STATES PATENT OFFICE.

ROBERT O. HAMMOND, OF NEW YORK, N. Y., ASSIGNOR TO GEORGE W. RENKEL AND JOHN D. MONTMEAT, BOTH OF PATERSON, NEW JERSEY.

SHIPPING CRATE OR CASE FOR EGGS OR THE LIKE.

1,155,234.   Specification of Letters Patent.   Patented Sept. 28, 1915.

Application filed October 22, 1914.  Serial No. 867,992.

*To all whom it may concern:*

Be it known that I, ROBERT O. HAMMOND, a citizen of the United States, residing at New York city, in the county of New York and State of New York, have invented certain new and useful Improvements in Shipping Crates or Cases for Eggs or the like, of which the following is a specification.

The present invention relates to shipping cases or crates for eggs and the like.

The primary object of the invention is the provision of an egg crate or case, wherein the construction is such that the eggs or other articles to be placed therein will be held from the dividing partitions in such manner that the same will be prevented from breaking.

Another object of the present invention is the provision of a crate or case such as above described, in which a pair of coöperating sections are provided, with flexible sheets or strips interposed therebetween, forming when the eggs or the like are placed therein, pockets for receiving the said eggs, which will retain the eggs in spaced relation from the edges or partitions of the spaced sections, and thereby insuring the said eggs against breakage.

A further object of the invention is the provision of an egg crate or shipping case, which will be comparatively simple and inexpensive to manufacture, reliable and efficient in use, and one in which the construction is such that the eggs or the like can be quickly positioned therein or removed therefrom.

With the above and other objects in view which will appear in the following detailed description, the present invention resides in the certain novel features of construction, formations, combinations, and arrangements of parts to be hereinafter more fully described, claimed and illustrated in the accompanying drawing, it being understood in this connection, that various minor changes in the specific details of construction, without departing from the spirit, or sacrificing any of the advantages of the invention.

Figure 1:
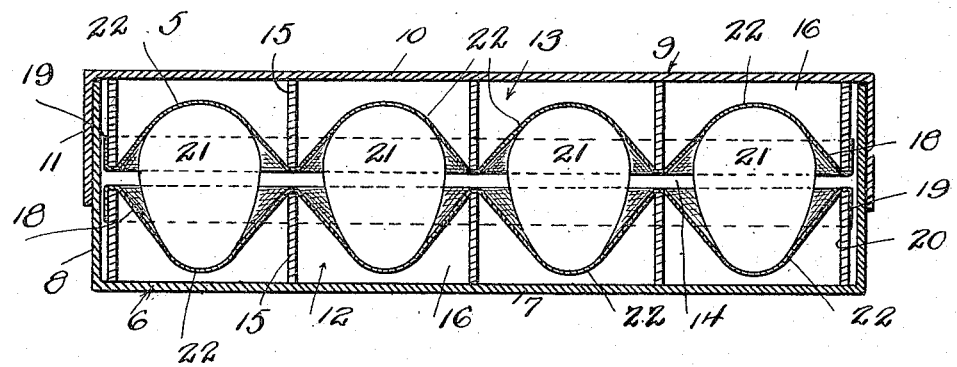
Figure 2:
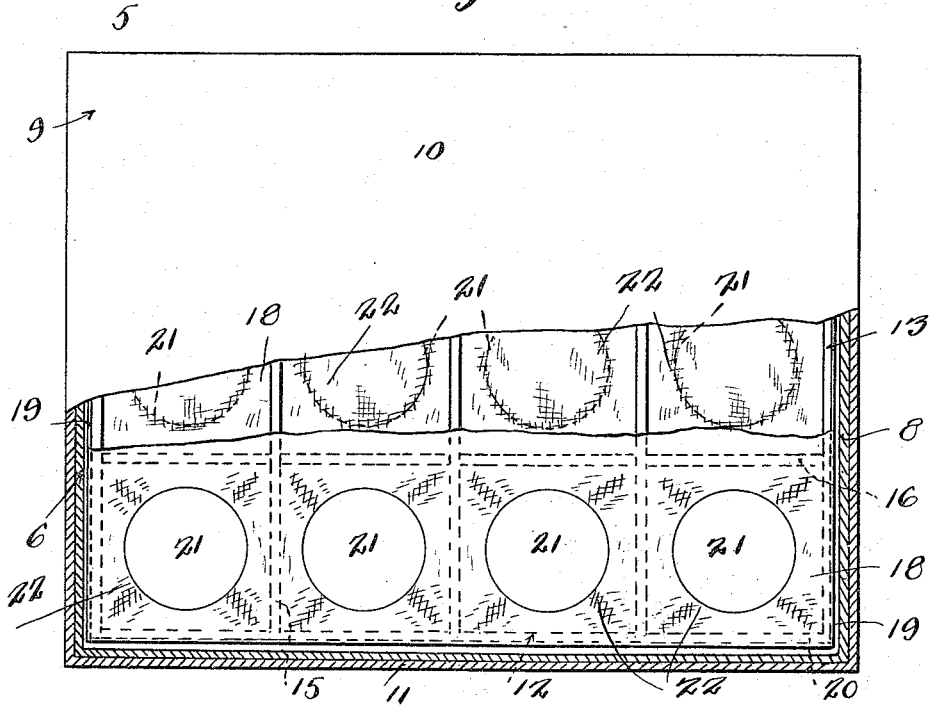

In the accompanying drawing, forming a part of this application, Figure 1 is a vertical longitudinal sectional view taken through an egg case or crate, constructed in accordance with the present invention; and Fig. 2 is a top plan view thereof, with parts thereof broken away.

Referring to the accompanying drawing, by similar characters of reference, throughout the several views, the numeral 5 denotes in general an egg case, which consists of a lower receptacle 6, comprising a bottom 7 and opposite side and end flanges 8, the same presenting preferably a rectangular appearance although I am not to be limited to any special shape, but may design the receptacle in any manner which will fulfil all the necessary requirements of such an article. This receptacle 6 may be formed from any suitable material but is preferably made of corrugated paste-board or the like.

A closure for the receptacle is shown at 9, and consists of a top 10, having side flanges 11 formed upon the edges thereof for slidable engagement with the before mentioned flanges 8 of the receptacle 6.

Upper and lower partition sections 13 and 12, are positioned within the receptacle 6, with their outer edges in engagement with the bottom 7 and top 10 respectively, while the inner edges thereof are spaced apart as shown by the character 14. Each of the sections 12 and 13, have longitudinal and transverse partitions 15 and 16 therein, which can be connected in any suitable manner and like the members 12 and 13 are removable.

Flexible strips or sheets 18 are disposed between the sections 12 and 13, and have there edges 19 secured to the outer sides 20 of the same in any efficient manner, but preferably by gluing. The sheets are disposed loosely so that when the eggs 21 or the like are positioned in the rectangular spaces between the partitions 15 and 16, the said sheets will be forced outwardly within said rectangular spaces, forming reverse coöperating pockets 22, for the reception of the said eggs 21. These pockets, through the flexibility of the strips or sheets, hold the eggs in spaced relation to the partitions 15 and 16, and outer sides 20, and insure the eggs or the like 21, against breakage.

From the foregoing disclosures, it will be manifest that a shipping crate or case for eggs or the like is provided, which will fulfil all the necessary requirements of such a device.

Having thus fully described this invention, what I claim as new and desire to protect by Letters Patent is:

In a shipping case for eggs, a lower and an upper section, each section comprising a base and lateral edge flanges adapted to telescope one within the other, longitudinal and transverse partitions removably disposed within said sections and spaced from the flanges thereof, the flanges of the lower sections fitting between the flanges of the upper section and adjacent sides of the partitions, said partitions being spaced apart when the upper section is fitted upon the lower section, and flexible sheets secured to the outer sides of the outer partitions between said partitions and flanges of the sections and extending loosely between said partitions whereby when eggs or the like are disposed between said partitions the flexible sheets will be forced in opposite directions forming pockets having communications therebetween by virtue of the spaced partitions and the partitions will be held in yielding engagement with the bases of said sections.

In testimony whereof I affix my signature in presence of two witnesses.

ROBERT O. HAMMOND.

Witnesses:
 JOHN H. SIGGERS,
 E. E. ALGER.

Copies of this patent may be obtained for five cents each, by addressing the "Commissioner of Patents. Washington, D. C."